May 26, 1942. A. J. LEWIS 2,284,158
APPARATUS FOR AUTOMATIC SOIL SPRINKLING SYSTEM
Filed July 22, 1940 4 Sheets-Sheet 1
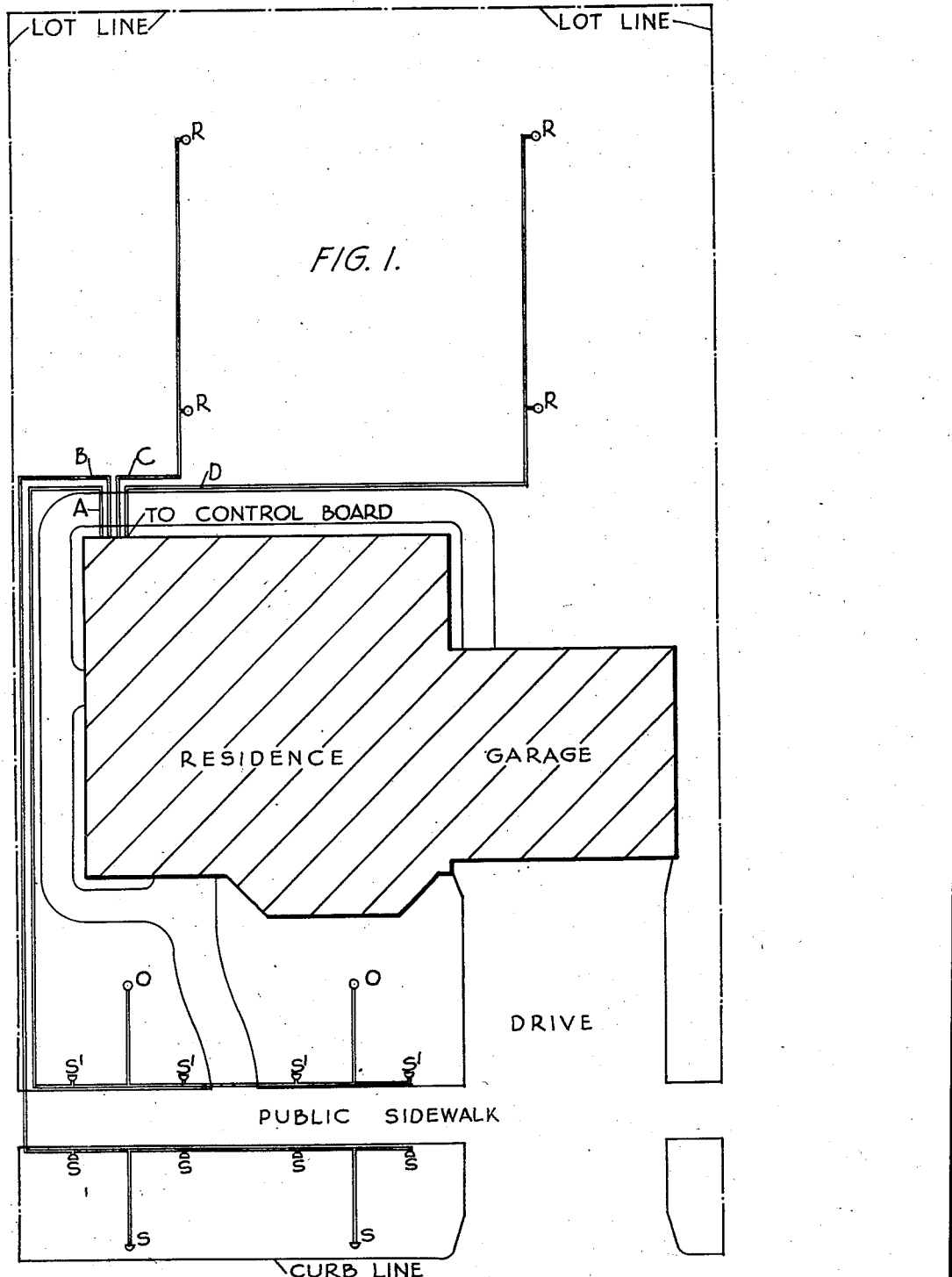

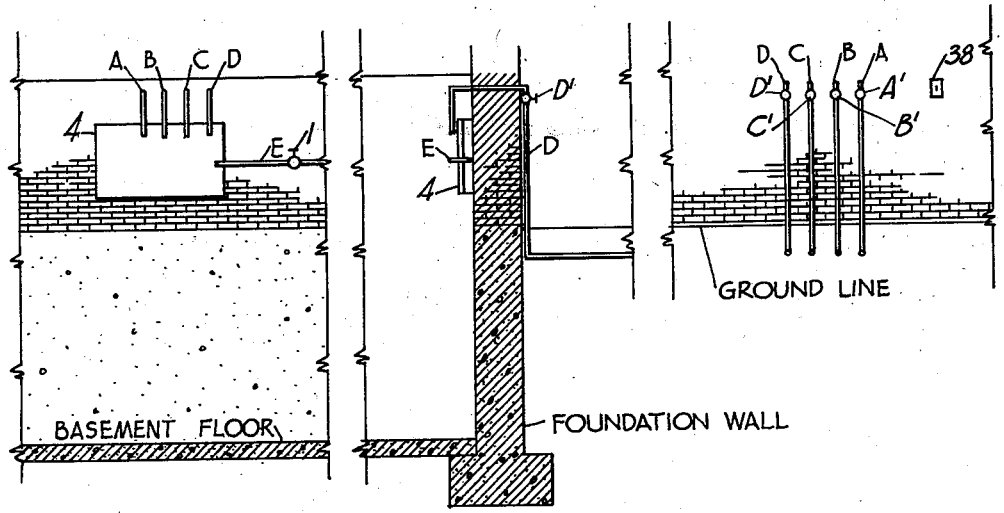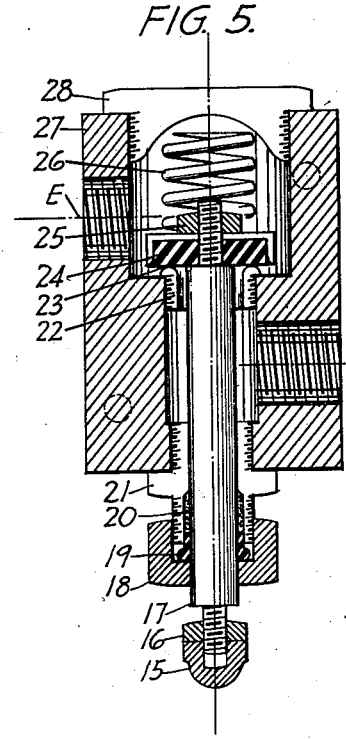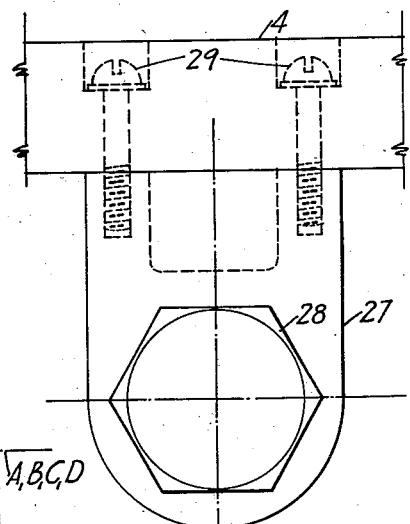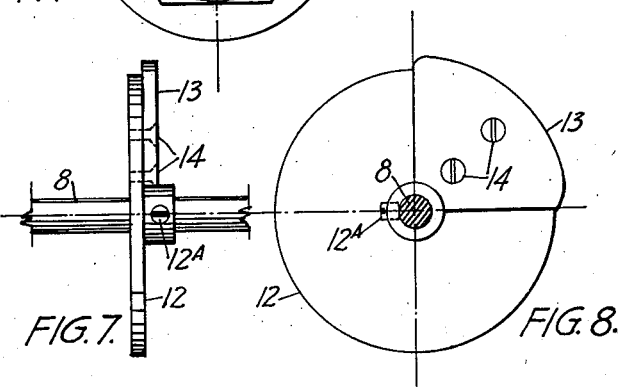

Patented May 26, 1942

2,284,158

UNITED STATES PATENT OFFICE 2,284,158

APPARATUS FOR AUTOMATIC SOIL SPRINKLING SYSTEMS

Alexander J. Lewis, Chicago, Ill.

Application July 22, 1940, Serial No. 346,683

3 Claims. (Cl. 161—7)

My invention relates to a water sprinkling system for lawns, gardens, orchards and other plots of ground, the system having novel features making it particularly efficient and labor saving.

The time necessarily devoted to sprinkling the soil is extensive during the spring and summer months, consuming many hours of the property owner's leisure time.

My sprinkling system, substantially automatic in its operation, has for its object the turning on and off of sprinkling heads and water lines at any time of the day or night according to a predetermined schedule without supervision, and where the water supply is insufficient or the water pressure is low, watering the soil in sections successively devoting a prescribed amount of sprinkling time to each section.

The soil to be served by this system is equipped in the usual way with an underground system of water pipes with sprinkling heads, except that in my system the piping is divided into sections so arranged that each section of piping and sprinkling heads serves its own definite area. The supply pipes for all of these sections are brought to a central point and there fed through a control device which is the principle of my invention.

The system that comprises my invention consists essentially of:

First: An electrically operated main shut-off water valve in the feed pipe from the source of water supply for the whole sprinkling system.

Second: A gang of mechanically operated valves controlling the individual section feed lines, conveniently mounted so as to be operated by a motor run mechanism for opening and closing the valves.

Third: A motor operated mechanism for opening the water supply valves and closing the water supply valves to the various sprinkling sections so constructed that by means of cams, gears or any suitable device it can be set to open and, after the desired interval, to close any of the valves according to any desired program.

Fourth: An electric time controlled motor driving the valve controlled mechanism through a gear reduction box.

Fifth: A clock equipped with electric contacts to open and close at predetermined times, the electric circuit that actuates the motor of the mechanism and the main electric shut-off valve for the entire system.

Sixth: A bucket and float equipped with a mercoid switch that actuates the motor of the mechanism and the main electric shut-off valve.

During rain the accumulation of water raises the bucket float and opens the electric circuit to the motor driving the cam shaft and electric water valve.

The system will be more readily understood by reference to the accompanying drawings in which:

Fig. 1 is a plan of a plot of ground having front and rear lawns. The pipe line arrangement showing sprinkling heads are of a character in which four sections are provided.

Fig. 2 is a fragmentary elevation of a brick wall showing the pipe lines from the sprinkling lines grouped to enter the basement at a location near the automatic control board.

Fig. 3 is a continuation of Fig. 2, showing the nipple connections which connect to the copper tubing outlet lines of the automatically controlled water valve.

Fig. 4 is a continuation of Fig. 2 and Fig. 3, showing copper tubing connections of automatically controlled water valves to nipples of the sprinkling lines.

Fig. 5 is a section of the automatically controlled water valve.

Fig. 6 is a plan of the automatically controlled valve housing as installed to the control panel.

Fig. 7 is an elevation of one of the cams installed on a section of a cam shaft.

Fig. 8 is a continuation of Fig. 7 showing a plan of a cam having a time wing attached.

Figure 9:
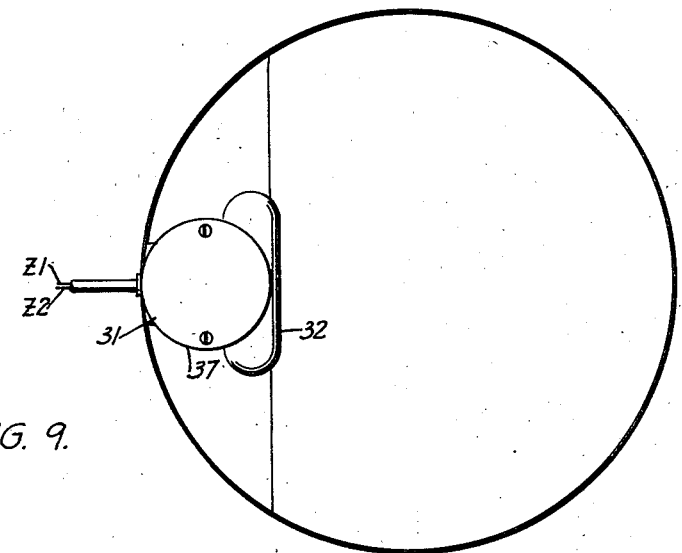
Fig. 9 is a plan of a rain bucket and float switch assembly.

In Fig. 1, I have shown a plot of ground having four water supply lines buried 10 ft. below the soil each line being equipped with sprinkling heads, revolving type sprinklers R, straight spray nozzles O, and side spray nozzles S and $S^1$. Supply line A controls the sprinkling heads $S^1$ and O, supply B controls the sprinkling heads S; supply lines C and D supply the sprinkling heads R, thereby dividing the piping arrangement into four separate sections.

In Fig. 2, I have shown where water supply lines A, B, C and D are grouped to enter the basement wall above the ground line and $A^1$, $B^1$, $C^1$ and $D^1$ are standard globe valves to shut off the water supply to any one of the water supply lines A, B, C and D. In Fig. 2, I have shown a switch 38 in series with main circuit lines $Z^1$ and $Z^2$, Fig. 12. Opening of this circuit with switch 38 causes the electric valve 3, Fig. 11, to close shutting off the water supply to the water feed lines A, B, C and D. It is only necessary to close valves $A^1$, $B^1$, $C^1$ and $D^1$ on water supply lines A, B, C and D when any one of the lines A, B, C and D are required to be turned off from the automatic cycling of the sprinkling system.

In Fig. 3, I have shown the main water supply line E which connects at the master control panel 4, to lines A, B, C and D for distribution of water to sprinkling heads.

In Fig. 4, I have shown the master control panel 4, and supply lines A, B, C and D in the basement with main water supply line E. Installed on main water supply line E, at a point where the main water supply line is connected to house service line is a hand operated valve $E^1$, to shut off the water from the control board during off season or when the sprinkling system is not required for long periods of time.

Fig. 5 is a section of a typical valve, valve body 27. The screwed plug 28 serves to compress spring 26 and assist in closing valve disc 24. Valve seat 22 is screwed into valve body 27. E shows supply line entering valve and the valve outlets A, B, C and D. It is readily seen that when cam wing 13 attached to cam 12, Fig. 7, raises valve stem 17 on Fig. 5; the water then enters the valve and discharges to the water supply lines A, B, C and D. This applies to all valves on the control panel at times and intervals of opening and closing according to predetermined time schedule. The following items included in Fig. 5 can be identified as: valve stem 15, lock nut to lock valve stem 16, valve stem 17, valve stem guide and packing box 21, packing nut 18, packing gland 19, packing 20, valve washer 23 and washer lock nut 25.

In Fig. 6, I have shown valve body 27 mounted on control panel 4 by means of screws 29.

In Fig. 7, I have shown a cam 12 mounted on a portion of the cam shaft 8. Attached to cam 12 is a time wing 13 fastened to cam 12 by means of screws 14. Set screw 12A fastens cam 12 to cam shaft 8.

Figure 10:
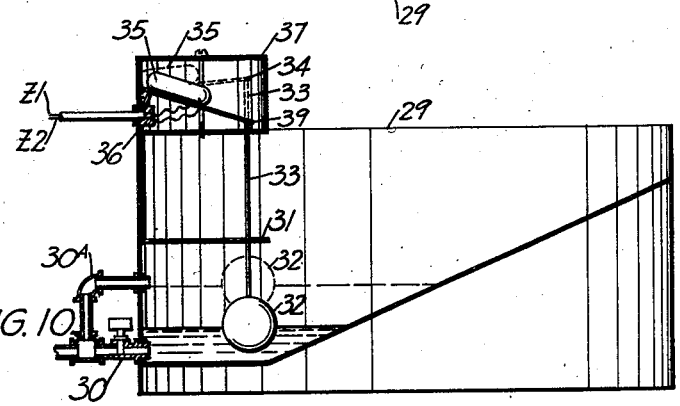
Fig. 10 is a continuation of Fig. 9, showing section of rain bucket and float switch assembly.

In Fig. 10, I have shown a rain bucket assembly consisting of a pan 29 with open top and fitted with a bracket 31 which serves as a guide for ball float rod 33, which is actuated by ball float 32. During rain the accumulation of water caught in pan 29 raises ball float 32 which in turn raises mercury switch 35 and mercury switch platform 34. By this operation the electric circuit is broken which closes electric main water supply valve 3. It will be understood that the circuit will remain open until water has dripped by leakage through petcock 30. When water is low enough to permit the ball float mechanism to make the mercury switch 35 close the circuit to the electric valve 3, the electric clock 6 and the electric motor 7, is completed. The bucket switch assembly includes switch platform bracket 36 and cover box 37. Installed on rain bucket pan 29, pipe line 30A is situated at a point where excess water entering the pan can be removed through petcock line 30.

Figure 11:
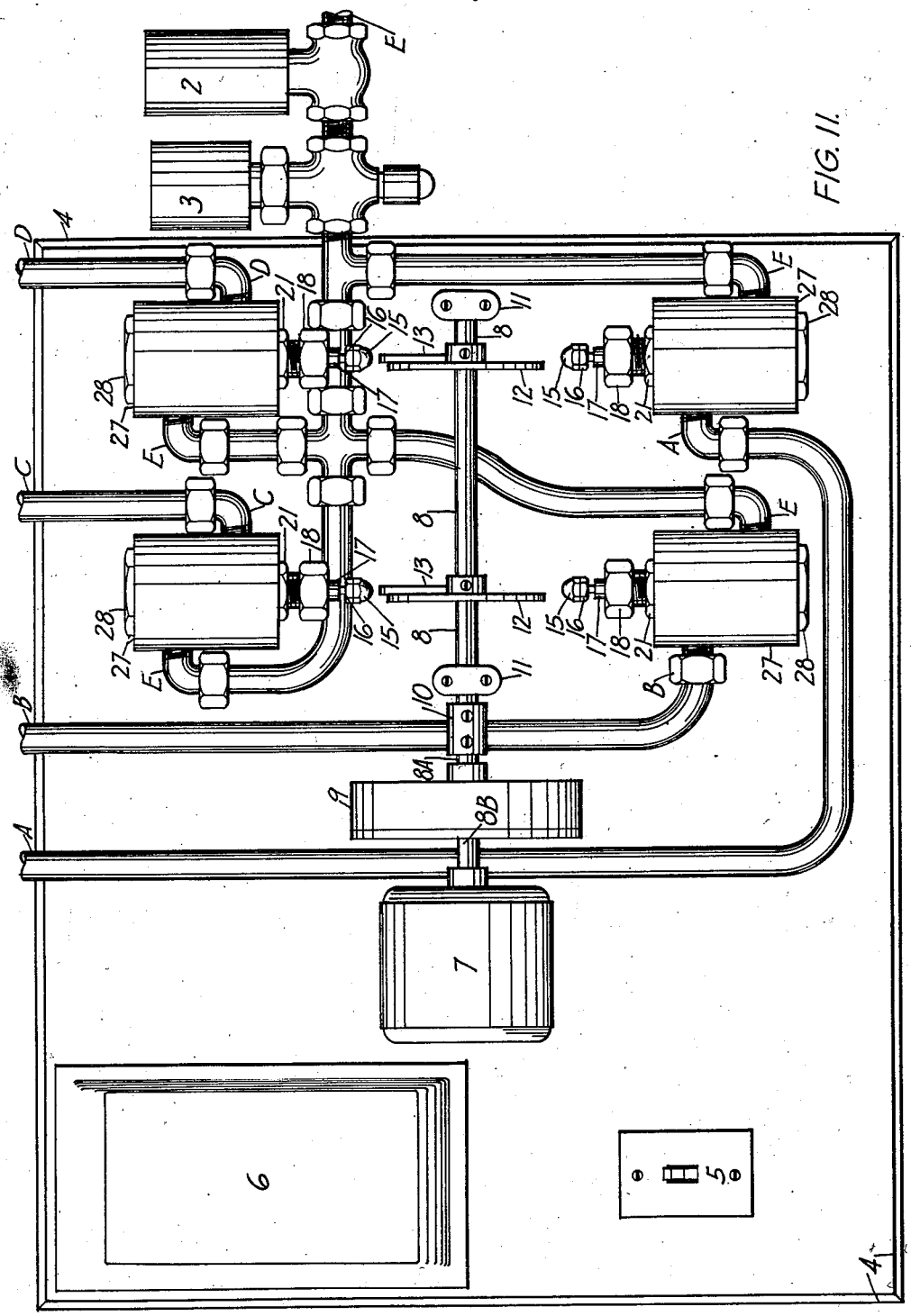
Fig. 11 is an elevation of the automatic sprinkling system unit comprising four automatic water valves, motor, reduction gear box, cams and cam shaft, electrically operated valve on the main water supply line and electric time clock.

In Fig. 11, I have shown a complete control board assembly consisting of water supply line E, feeding water through strainer 2 to electric water supply valve 3, then through the supply lines E to valve bodies 27, through valve bodies 27 to sprinkling supply lines A, B, C and D. Electric switch 5 controls main circuits $Z^1$ and $Z^2$, which is the master electric control switch. The electric time clock 6 controls the time "on" and time "off" by opening and closing a circuit to the electric motor 7. It being understood that all other circuit breaking devices are closed, motor 7, when energized through circuit $Z^1$ and $Z^2$, operates shaft 8B. Connected to shaft 8B is gear reduction unit 9 which revolves once in every two hours or at any other ratio as may be necessary. Gear reduction unit 9 has shaft 8A, coupling 10, and cam shaft 8 which revolve in bearings 11. Cam 12 and cam wing 13 revolve with cam shaft 8 to open and close the water valves as previously described. Cam wings 13 are set on the cam 12 to operate valve stems 17, thereby obtaining the opening and closing movements for the water supply to sprinkling lines A, B, C and D.

The panel board 4 serves as the mounting for the electric switch 5, electric time clock 6, motor 7 and reduction unit 9, bearing 11 and valve bodies 27.

Figure 12:
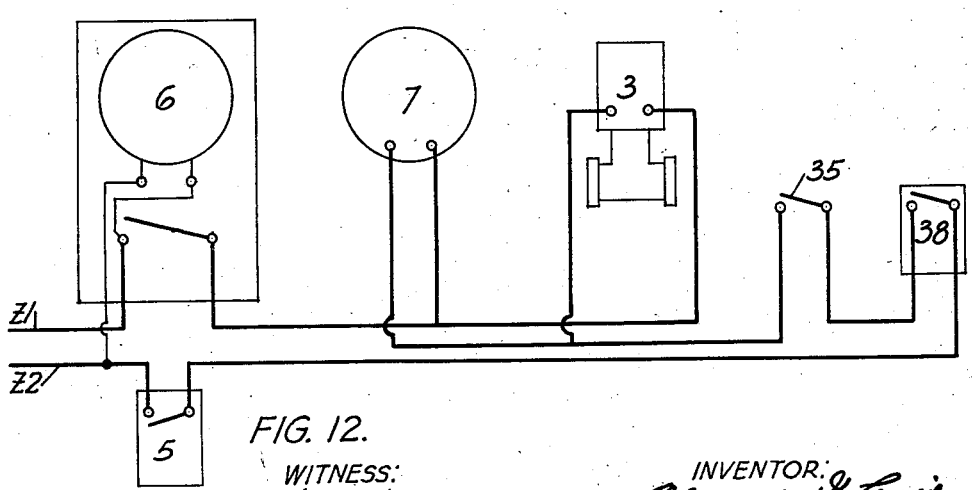
Figure 12 is a wiring diagram.

Figure 12 shows the wiring diagram for the various elements described above. 5 is the master control switch mounted on the master control panel 4. Switch 38 is a manually operated switch, which may conveniently be installed on the outside basement wall where the distributing pipes enter the basement. 35 is the precipitation switch automatically operated through the medium of the ball float 32. Switches 5, 38 and 35 are connected in series in the line conductor Z2, while motor 7 and valve 3 are connected in parallel across the line conductors Z1 and Z2 beyond such switches. The clock circuit breaker is connected in line Z2 between motor 7 and the motor of clock 6, the motor of clock 6 being connected across the line conductors Z1 and Z2 before such circuit breaker. When any of the switches 5, 35 or 38 are open valve 3 will remain closed and the motor 7 deenergized, even though the clock circuit breaker should close. The circuit breaker is closed and opened at predetermined times by the time clock and, when switches 5, 35 and 38 are closed the motor 7 will, therefore, be started and stopped simultaneously with opening and closing of valve 3. There is no interruption to the flow of electric circuit to the time clock motor by any of the switches or by the circuit breaker.

The simplicity of the wiring arrangement is readily seen. It affords the shutting off of water by opening and closing switches at convenient points and frequent shutting on and off the water does not interfere with the setting of the time clock mechanism or altering the time that would synchronize with standard time.

In general, the operation of the system will have been understood from the preceding description. It may be well to add, however, that the system is entirely flexible in that it provides for the supply of water evenly distributed at any hour of the day or night most suitable for conditions and circumstances. It provides for the distribution of water either through city pressure or pressure supplied by pumps drawing water from wells or pumps drawing water from storage tanks.

It is desirable to rotate the shaft at a speed to allow each valve to remain open for a period of not less than fifteen minutes although this can be arranged for any speed or time interval the valve is desired to remain open. The average discharge of water to each sprinkling head is three and one-half gallons per minute covering an area of fifteen to twenty feet, depending upon available pressures. With this quantity of water the valves can be made to operate accordingly. The time clock can also be set to operate the motor for any period of time thus allowing the shaft to rotate at a speed which allows each valve to remain open for fifteen minute intervals.

The magnetic valve installed on the main line prevents leakage of water if the cam shaft should stop in such a position that one valve would remain open. When the circuit is broken by the operation of the electric rain switch the solenoid valve immediately closes preventing water from passing through from the main line to the distributing lines.

The system saves water by eliminating the overwatering of spots or sections. It is also advantageous for watering delicate plants or spraying fertilizing compounds. During summer evenings this system is advantageous when the water supply is below normal, the controls being constructed to operate only one section at a time.

The bucket switch, or rain switch, can be installed on a down-spout to catch rain water in sufficient quantities as to operate a mercoid switch which is connected to the magnetic valve circuit and electric motor circuit. This prevents the operating of the sprinkling system even when the clock closes the contact. This is extremely advantageous if the system is set to operate during the night or when the owner is away from the premises by eliminating sprinkling during a rain fall.

Any number of valves can be operated by one shaft and one motor either in line or tandem. It is simple in its operation and can be constructed at comparatively low cost.

I claim:

1. In an automatically operable sprinkling system, the combination of a water supply pipe, a plurality of separate individual distributing valves each connected to the water supply pipe, a solenoid valve in the supply pipe controlling admission of water to the distributing valves, an electric motor, timing means controlling starting and stopping of said motor and simultaneously opening and closing of said solenoid valve, a rotatable shaft, reduction gearing between said motor and shaft, and cam members on said shaft successively opening said distributing valves to permit flow of water therefrom upon actuation of said motor and rotation of said shaft.

2. In an automatically operable sprinkling system, the combination of a water supply pipe, a plurality of separate individual distributing valves each connected to the water supply pipe, a solenoid valve in the supply pipe controlling admission of water to the distributing valves, an electric motor, timing means controlling starting and stopping of said motor and simultaneously opening and closing of said solenoid valve, a rotatable shaft, reduction gearing between said motor and shaft, and cam members on said shaft normally free of but arranged to move into and out of engagement with said distributing valves to effect opening and closing thereof upon actuation of said motor and rotation of said shaft.

3. In an automatically operable sprinkling system, the combination of a water supply pipe, a plurality of separate individual distributing valves each connected to the water supply pipe, a solenoid valve in the supply pipe controlling admission of water to the distributing valves, an electric motor, timing means controlling starting and stopping of said motor and simultaneously opening and closing of said solenoid valve, a rotatable shaft, reduction gearing between said motor and shaft, cam members on said shaft successively opening said distributing valves to permit flow of water therefrom upon actuation of said motor and rotation of said shaft, and means controlled by atmospheric precipitation operative to maintain said solenoid valve closed and said motor deenergized independently of operation of said timing means.

ALEXANDER J. LEWIS.